(No Model.)
C. J. HIRLIMANN
ELECTRIC BATTERY.
No. 554,124. Patented Feb. 4, 1896.
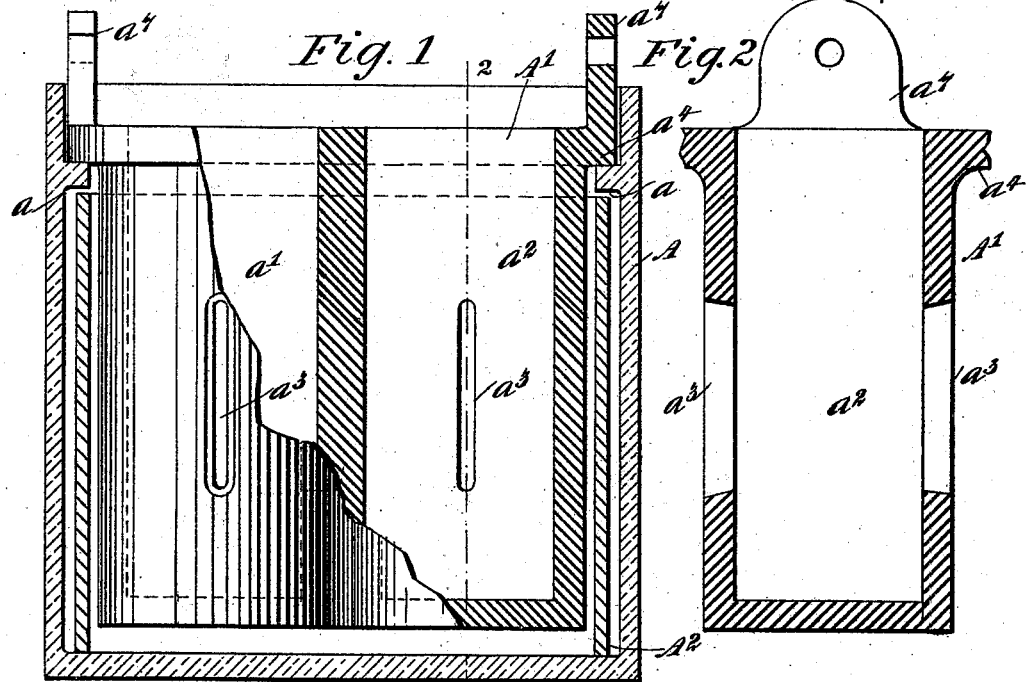
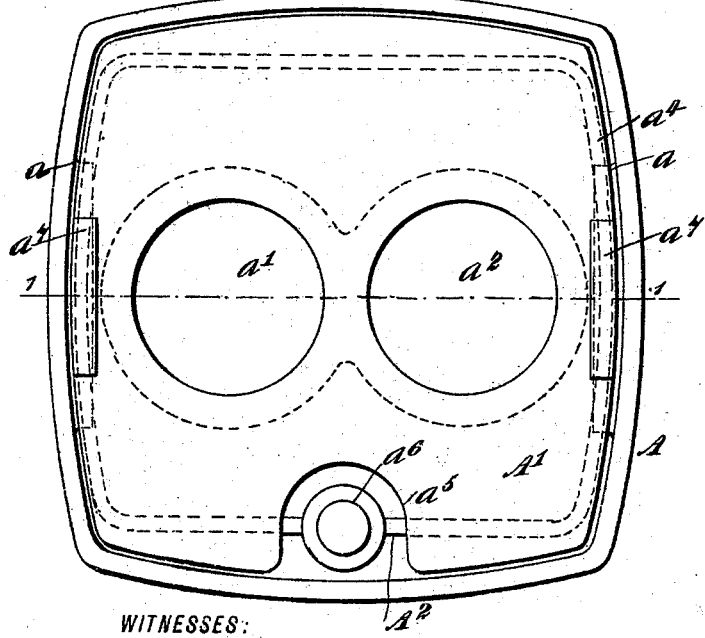
WITNESSES:
J. B. Walker
C. R. Ferguson
INVENTOR
C. J. Hirlimann
BY
Munn & Co
ATTORNEYS.

UNITED STATES PATENT OFFICE.

CHARLES J. HIRLIMANN, OF FORT LEE, NEW JERSEY.

ELECTRIC BATTERY.

SPECIFICATION forming part of Letters Patent No. 554,124, dated February 4, 1896.

Application filed October 25, 1895. Serial No. 566,802. (No model.)

*To all whom it may concern:*

Be it known that I, CHARLES J. HIRLIMANN, of Fort Lee, in the county of Bergen and State of New Jersey, have invented certain new and useful Improvements in Electric Batteries, of which the following is a full, clear, and exact description.

This invention relates to electric batteries; and the object is to provide a battery in which there is a large surface of the carbon element in a single cell, thereby doubling the capacity of a single cell.

I will describe a battery embodying my invention and then point out the novel features in the appended claim.

Reference is to be had to the accompanying drawings, forming a part of this specification, in which similar characters of reference indicate corresponding parts in all the figures.

Figure 1 is a partial elevation and partial section on the line 1 1 of Fig. 2. Fig. 2 is a section of one of the elements on the line 2 2 of Fig. 1, and Fig. 3 is a plan view of the battery.

Referring to the drawings, A designates a jar, of glass or similar material, here shown as substantially rectangular in form, but the shape is not material to my invention. It is provided on two of its opposite inner sides with flanges $a$ for supporting the carbon element $A'$.

The carbon element $A'$ comprises two cup portions $a'$ $a^2$, each adapted to contain a granular exciting material—such, for instance, as peroxide of manganese—and the walls of the cups are provided with slot-openings $a^3$, so that an acidulated liquid in the jar may circulate freely through them. The upper portion of the carbon element $A'$ has an outwardly-extended flange $a^4$, adapted to rest on the flanges $a$ and support the element above the bottom of the jar A, as indicated in the drawings. One side of the flange $a^4$ is provided with a notch $a^5$ for the passage of the binding-post $a^6$ of the zinc element $A^2$, which surrounds the carbon element.

The carbon element $A'$ has two upwardly-extending ears $a^7$, to which line-wires may be attached by means of the usual binding-screws.

It is obvious that a carbon element of the form shown and described will present a large surface to the action of the exciting medium, and that it will provide, practically, a two-cell battery in one jar, which need not be larger than the ordinary single-cell jar.

Having thus described my invention, I claim as new and desire to secure by Letters Patent—

The combination with a jar having interior flanges, and a zinc element extending around the interior of the jar, of a carbon element comprising two cup portions having perforated walls, a flange on the upper portion of the carbon element, adapted to rest on the flanges in the jar, and two ears on the carbon element to which line-wires may be connected, substantially as specified.

CHARLES J. HIRLIMANN.

Witnesses:
JOSEPH WEILL,
THOMAS E. GORMAN.